US009505919B2

(12) United States Patent
Malzburg et al.

(10) Patent No.: US 9,505,919 B2
(45) Date of Patent: Nov. 29, 2016

(54) PROCESS FOR STOPPING AND RESTARTING POLYMERISATION

(71) Applicant: INEOS EUROPE AG, Vaud (CH)

(72) Inventors: Stephan Malzburg, Dormagen (DE); Stefan Matull, Cologne (DE); Dirk Schroder, Odenthal (DE)

(73) Assignee: INEOS EUROPE AG, Vaud (CH)

( * ) Notice: Subject to any disclaimer, the term of this patent is extended or adjusted under 35 U.S.C. 154(b) by 0 days.

(21) Appl. No.: 14/649,322

(22) PCT Filed: Dec. 13, 2013

(86) PCT No.: PCT/EP2013/076529
§ 371 (c)(1),
(2) Date: Jun. 3, 2015

(87) PCT Pub. No.: WO2014/095624
PCT Pub. Date: Jun. 26, 2014

(65) Prior Publication Data
US 2015/0315315 A1    Nov. 5, 2015

(30) Foreign Application Priority Data

Dec. 18, 2012  (EP) ..................................... 12197833
Dec. 18, 2012  (EP) ..................................... 12197874

(51) Int. Cl.
| | |
|---|---|
| *C08F 2/00* | (2006.01) |
| *C08F 210/00* | (2006.01) |
| *B01J 19/00* | (2006.01) |
| *C08L 23/08* | (2006.01) |
| *C08F 210/16* | (2006.01) |
| *B01J 19/24* | (2006.01) |
| *C08F 2/01* | (2006.01) |
| *C08F 2/34* | (2006.01) |
| *C08F 2/42* | (2006.01) |

(52) U.S. Cl.
CPC ............. *C08L 23/0815* (2013.01); *B01J 19/24* (2013.01); *C08F 2/01* (2013.01); *C08F 2/34* (2013.01); *C08F 2/42* (2013.01); *C08F 210/16* (2013.01); *B01J 2219/0004* (2013.01); *B01J 2219/24* (2013.01)

(58) Field of Classification Search
CPC .......... C08F 2/01; C08F 2/34; C08F 210/16; C08F 2/42; C08L 23/0815; B01J 19/24; B01J 2219/0004; B01J 2219/24

USPC .................................. 526/86, 348; 422/131
See application file for complete search history.

(56) References Cited

U.S. PATENT DOCUMENTS

| | | | |
|---|---|---|---|
| 6,838,532 B2 | 1/2005 | Veariel et al. | |
| 6,867,270 B2 | 3/2005 | Savatsky et al. | |
| 8,148,481 B2 | 4/2012 | Hussein et al. | |
| 2004/0127655 A1* | 7/2004 | Veariel ................... | B01J 8/0035 526/82 |
| 2004/0167299 A1 | 8/2004 | Savatsky et al. | |
| 2004/0214969 A1 | 10/2004 | Ehrman et al. | |

FOREIGN PATENT DOCUMENTS

| | | |
|---|---|---|
| EP | 0 494 316 B1 | 5/1996 |
| WO | WO 00/58377 A1 | 10/2000 |
| WO | WO 2004/060922 A2 | 7/2004 |
| WO | WO 2011/089112 A1 | 7/2011 |

OTHER PUBLICATIONS

Specification of Co-pending U.S. Appl. No. 14/649,262, filed Jun. 3, 2015, which is a National Phase of PCT International Application No. PCT/EP2013/076531 (WO 2014/095626 A1), filed Dec. 13, 2013, 19 pgs.

* cited by examiner

*Primary Examiner* — William Cheung
(74) *Attorney, Agent, or Firm* — Nixon & Vanderhye P.C.

(57) ABSTRACT

Process for stopping and restarting a polymerization in a system having a gas phase fluidized bed or stirred bed reactor, a degassing vessel and a seedbed storage silo, by conducting a first polymerization in the reactor using a polymerization catalyst to produce a first polymer, stopping the polymerization and removing the first polymer from the reactor to the degassing vessel, and either:
  introducing from the seedbed storage silo into the reactor a different seed-bed compatible with a second polymerization, passing to the seedbed storage silo the first polymer from the degassing vessel to form a new seedbed in the storage silo, and conducting the second polymerization in the reactor to produce a second polymer; or
  passing to the reactor at least a portion of the first polymer from the degassing vessel to thereby form a new seedbed in the reactor, and conducting a polymerization in the reactor to produce polymer.

20 Claims, No Drawings

PROCESS FOR STOPPING AND RESTARTING POLYMERISATION

This application is the U.S. national phase of International Application No. PCT/EP2013/076529 filed Dec. 13, 2013 which designated the U.S. and claims priority to European Patent Application Nos. 12197833.2 filed Dec. 18, 2012, and 12197874.6 filed Dec. 18, 2012, the entire contents of each of which are hereby incorporated by reference.

The present invention relates to a process for stopping and restarting polymerisation in a polymerisation system comprising a gas phase fluidised bed or stirred bed reactor.

Numerous methods are known for transitioning between production of different polymer products in a polymerisation reactor, such as a fluidised bed reactor. In general, such processes can be defined based on whether or not there is a catalyst system change, and where there is a catalyst system change, whether or not the catalyst systems are "compatible" or "incompatible".

For example, transitions where the same catalyst system is used for both the first and second polymers are generally relatively easier since there is no issue of one catalyst system affecting the performance of the other or the properties of the polymer produced by the other. The same is generally the case where the catalyst systems are "compatible", this term generally referring to different catalyst systems which have no or relatively minimal influence on the performance of the other or the properties of the polymer produced by the other.

Such processes can generally be accomplished in a "continuous" manner by simply stopping feed of one catalyst system, adjusting the reactor conditions, and starting feed of the second catalyst system. Although such transitions are relatively simple in concept, because of the volume of first polymer in the fluidised bed when the first catalyst system is stopped and time taken to replace this with polymer according to the specification of the second polymer, such processes can produce significant amounts of off-specification material during the transition.

In addition, even with compatible catalyst systems it can still be necessary to ensure that the polymer bed present from the first reaction is 'compatible' with the reaction conditions for the subsequent reaction. For example, polymers produced at a relatively low temperature can sinter if exposed to much higher temperatures in a subsequent reaction.

Whilst various continuous and semi-continuous transitions have been proposed in the art therefore, in many cases it is necessary to stop polymerisation, remove the bed of the first polymer, and therefore any remains of the first catalyst system, and refill the reactor with a new bed, called a seed-bed, of polymer prior to restarting polymerisation.

U.S. Pat. No. 6,838,532 relates to such transitions. In this document, the contents of the reactor are removed whilst maintaining a substantially closed system. Subsequently a substantially contaminant free seed bed is introduced into the reactor. The substantially contaminant free seedbed may be formed in the first place by recovering polymer product from the polymerisation reactor, purging this to remove contaminants, then storing this under nitrogen for subsequent use.

U.S. Pat. No. 6,838,532 thus describes the formation of a seedbed from a first polymer product during a first polymerisation reaction, and then using this seedbed in a second polymerisation reaction using an incompatible catalyst system.

Whilst such a process can work where the conditions of the second polymerisation reaction are compatible with the polymer from the first polymerisation reaction this is not always the case.

Thus, in some scenarios it is necessary to obtain a seedbed compatible with the conditions of the second polymerisation reaction, and this cannot be obtained from the first polymerisation reaction. As an Example, in transitions between chrome-based catalyst systems and metallocene catalyst systems the temperatures under which each of the catalyst systems operate at are significantly different.

Alternative seedbeds can sometimes be obtained from other reactors, which is another option taught by U.S. Pat. No. 6,838,532. More generally, however, in order to have suitable seedbeds readily available it has previously been considered necessary to have storage units for different types of seedbed which can then be selected based on the second polymerisation reaction.

U.S. Pat. No. 6,867,270, for example, teaches a process in which different seedbeds are recovered and stored from every product which is formed.

This is a particularly extreme example, however, and more usually it is sufficient to have a more limited number of seedbeds.

Nevertheless, there is still a significant capital cost associated with each storage silo which is required for seedbeds.

A process has now been found which avoids issues of incompatibility whilst minimising the requirement for numerous seedbed storage silos.

Thus, in a first aspect, the present invention provides a process for stopping and restarting polymerisation in a polymerisation system comprising a gas phase fluidised bed or stirred bed reactor, a degassing vessel and a seedbed storage silo, said process comprising the steps of:

a) Conducting a first polymerisation reaction in the reactor using a first polymerisation catalyst system to produce a first polymer, b) Stopping the first polymerisation reaction and removing at least the majority of the first polymer in the reactor to the degassing vessel, and either:

c1) Introducing from the seedbed storage silo and into the reactor a seed-bed compatible with a second polymerisation reaction, d1) Passing to the seedbed storage silo at least a portion of the first polymer from the degassing vessel to thereby form a new seedbed in the storage silo, and e1) Conducting the second polymerisation reaction in the reactor to produce a second polymer;

or c2) Optionally, maintaining in the seedbed storage silo a seed-bed compatible with a second polymerisation reaction, d2) Passing to the reactor at least a portion of the first polymer from the degassing vessel to thereby form a new seedbed in the reactor, and e2) Conducting a polymerisation reaction in the reactor to produce polymer.

The reactor is preferably a gas phase fluidised bed reactor.

In one option (steps c1-e1), the process of the first aspect of the present invention allows a polymerisation reactor to transition between first and second polymerisation reactions in which the first polymer is incompatible with the conditions of the second polymerisation reaction. As used herein, these are referred to as "incompatible reactions". This is achieved by passing a previously stored seedbed to the reactor, said seedbed being compatible with the second polymerisation reaction.

The "seed bed compatible with a second polymerisation reaction" may be a seed bed of the second polymer (for example formed previously), or any other seed bed compatible with the second polymerisation reaction. In particular, the term "seed bed compatible with a second polymerisation reaction" means that the second reaction can be operated in the presence of the seed-bed to produce the second polymer and the seed-bed does not significantly negatively affect the production rate of second polymer compared to the use of a bed of the second polymer itself. As used herein "not significantly negatively affect the production rate" means that the production rate obtained with the compatible seed bed is no less than 90% of the production rate obtained under the same conditions using a bed of the second polymer itself. (Where either or both of the respective seedbeds are stored with a level of contaminants as described further below, the above comparison should also take place for equivalent contaminant levels at start-up, and preferably where both seedbeds have less than 20 ppm contaminants as described further below.)

It should be apparent that the seed-bed compatible with a second polymerisation reaction in the present invention is a seed-bed which is of a different material to the first polymer. In particular, in a transition where the first polymer is incompatible with the conditions of the second polymerisation reaction, but the seed-bed is compatible with a second polymerisation reaction then the seed-bed must, by definition, be different to the first polymer. Preferably the seed-bed compatible with a second polymerisation reaction is a polymer (which polymer is a different polymer to the first polymer).

In a second option (steps c2-e2), the reactor can be restarted with a seedbed formed of first polymer recovered from the first polymerisation reaction. In this option there is passed to the reactor at least a portion of the first polymer from the degassing vessel to thereby form a seedbed in the reactor for the subsequent reaction.

In this second option there is optionally, a step (c2) of "maintaining in the seedbed storage silo a seed-bed compatible with a second polymerisation reaction". This step is preferred, the seedbed in the storage silo being maintained therein for potential use in a subsequent transition according to the first option.

In this second option the first polymer should be compatible with the restarted polymerisation reaction i.e. the first polymerisation catalyst system is compatible with the subsequent polymerisation catalyst system used or has been irreversibly killed in the polymer returned to the reactor from the degassing vessel and the first polymer is compatible with the conditions of the subsequent polymerisation reaction. (For avoidance of doubt the subsequent polymerisation catalyst system used may be the same as the first polymerisation catalyst system and the subsequent polymerisation reaction may be operated under the same conditions and to produce the same product as the first polymerisation reaction.)

The seedbed in this second option should be passed directly from the degassing vessel to the reactor, by which is meant without passing through any intermediate storage silos.

This second option may be useful where it is desired to stop polymerisation and remove polymer from the reactor, and then re-start under conditions similar to those before stopping. In such a scenario the reactor can be reloaded with at least a portion of the first polymer from the degassing vessel.

As noted above, the restarted polymerisation reaction in this second option may be the operated with the same polymerisation catalyst system and to produce the same polymer as the first polymerisation reaction i.e. the starting and stopping are not performed to transition to a different product.

It is also possible that the restarted polymerisation reaction produces a different polymer product to the first polymer i.e. is a transition from a first to a subsequent polymer product. The first polymer should be compatible with the restarted polymerisation reaction as already noted.

It is not necessary that the first and subsequent catalyst system are the same in this second option, but nevertheless it is a preferred embodiment of this option that the catalyst system used for the restarted polymerisation reaction is the first polymerisation catalyst system i.e. there is no catalyst system change even if there is a polymer product transition.

However, whilst the second option is a useful option in the overall operation of a gas phase fluidised bed or stirred bed reactor with the facility to operate incompatible reactions, a key element of the present invention is the ability to transition between such incompatible reactions in a process with a reduced number of silos.

Thus, in a second aspect, the present invention provides a process for transitioning in a polymerisation system comprising a gas phase fluidised bed or stirred bed reactor, a degassing vessel and a seedbed storage silo, said process comprising the steps of:
  a) Conducting a first polymerisation reaction in the reactor using a first polymerisation catalyst system to produce a first polymer,
  b) Stopping the first polymerisation reaction and removing at least the majority of the first polymer in the reactor to the degassing vessel,
  c) Introducing from the seedbed storage silo and into the reactor a seed-bed compatible with a second polymerisation reaction,
  d) Passing to the seedbed storage silo at least a portion of the first polymer from the degassing vessel to thereby form a new seedbed in the storage silo, and
  e) Introducing a polymerisation catalyst system and conducting the second polymerisation reaction in the reactor to produce a second polymer.

As with the first aspect, the reactor of this second aspect is preferably a gas phase fluidised bed reactor.

This second aspect will now be described in more detail. However, this second aspect is also a preferred embodiment of the first aspect, and the description hereinafter of the second aspect equally applies to this option of the first aspect.

The process of the second aspect allows a polymerisation reactor to transition between first and second polymerisation reactions in which the first polymer is incompatible with the conditions of the second polymerisation reaction. As already noted, as used herein these are referred to as "incompatible reactions".

In this second aspect a previously obtained seedbed compatible with a second polymerisation reaction is passed from a seedbed storage silo to the reactor for the second polymerisation reaction, and a new seedbed formed from the first polymer is then stored in the seedbed storage silo. At a later date, when it is desired to transition back to operation under conditions either the same or similar to (or generally as might be referred to as "compatible" with) those used originally to form the first polymer, the reverse process may be followed i.e. the later reaction is stopped, a bed of polymer compatible with the second polymerisation reaction removed from the reactor, the first polymer seedbed is transferred from the seedbed bed storage silo to the reactor, and a seedbed of polymer compatible with the second polymerisation reaction is transferred to and stored in the seedbed storage silo again.

In such a way a polymerisation process may transition backwards and forwards between two incompatible reactions with only a single seedbed storage silo.

Similarly, a polymerisation process may transition backwards and forwards across a range of three incompatible reactions whilst requiring only two seedbed storage silos.

The second aspect of the invention includes transitions where first and second catalyst systems are used for producing the first and second polymers which catalysts may be incompatible, but as used herein the term "incompatible reactions" also includes (and the present invention may be applied) where first and second polymerisation catalyst systems are compatible (but the first polymer is incompatible with the conditions of the second polymerisation reaction).

For avoidance of doubt it should also be noted that incompatible reactions may be incompatible only in one direction. For example, in a transition between a first reaction and a second reaction where the second reaction is operated at a significantly higher temperature than the first reaction, the first polymer may be incompatible with the higher temperature of the second polymerisation reaction because the higher temperature will cause sintering of the first polymer. Thus, the first polymer has to be removed and replaced with a seedbed compatible with the higher temperature during a transition between the two reactions. However, in the reverse transition the polymer formed at the "high temperature" conditions may not be incompatible with the lower temperature of the initial reaction conditions.

Although the present invention can be applied to such systems, more usually the reaction conditions are incompatible because the first and second catalyst systems are also incompatible, and such embodiments are preferred.

In both the first and second aspects of the present invention the reactor is initially producing a first polymer using a first polymerisation catalyst system. The first polymer may be any suitable polymer which can be produced in a gas phase fluidised bed or stirred bed reactor. Examples are propylene- and ethylene-based polymers, such as homopolymers and copolymers of propylene, and homopolymers and copolymers of ethylene.

Similarly, the first polymerisation catalyst system may include any catalyst suitable for the polymerisation. Commercially-used catalysts include Phillips catalysts, Ziegler catalysts and metallocene catalysts. It is also known to use mixed catalysts.

For avoidance of doubt, the term "catalyst" as used herein describes the catalytically active composition introduced into the polymerisation reactor, for example a Ziegler-Natta, Phillips (Chromium) or metallocene catalyst.

The term "catalyst system" as used herein describes the catalyst plus any co-catalyst or additive that is added with the catalyst to the polymerisation reactor, for example alkyl aluminum co-catalysts; external donors, such as silanes; or continuity additives, such as antistatic agents. Where no co-catalyst or other additive is used with the catalyst, then the terms "catalyst" and "catalyst system" are synonymous.

The reactor may be a "stand-alone" reactor, or may be one of a number of reactors, including one of two or more reactors operated in series. Where other reactors are present in series they may also be gas phase fluidised bed or stirred bed reactors or may be another type of reactor, such as slurry loop or stirred tank polymerisation reactors.

In both the first and second aspects of the present invention step (b) requires to stop the first polymerisation reaction and remove at least the majority of the first polymer in the reactor to a degassing vessel. Generally the first step in stopping the first polymerisation reaction is to stop the feed of the first catalyst system. It can be noted that stopping the feed of the catalyst system does not in itself lead to an immediate stopping of polymerisation, and it is possible to allow the reaction to continue for some time whilst the activity dies off before polymer removal is commenced.

The removal of at least a majority of the polymer may be commenced only when the first polymerisation reaction has stopped. However, it is also possible to start to remove the first polymer whilst the reaction continues—for example maintaining withdrawal rate whilst reaction dies off inherently starts to remove polymer faster than it is being formed.

It is also possible to start to remove the first polymer before the feed of catalyst system is stopped.

Although the process of the present invention may be operated without use of a deactivating agent to stop the first reaction, it is possible to use one. Thus, after the catalyst system feed is stopped a deactivating agent may be added to the reactor to stop reaction completely. This may be done immediately after the stopping of the catalyst system feed, or the reaction may be allowed to continue for some time before the deactivating agent is added as noted above.

As a specific example, feed of the first polymerisation catalyst system may be stopped. The activity may be allowed to die off for a period of time of at least 15 minutes, and then polymer removal is commenced. Immediately prior to, or during, polymer removal a deactivating agent is added to stop the reaction completely.

Methods for the removal of the polymer are known. A preferred method in a fluidised bed reactor involves maintaining the bed of polymer in the reactor in a fluidised state and removing the polymer bed through the normal product discharge conduits. Specific discharge conduits may be provided to enable complete removal of the polymer where the normal product discharge conduits cannot do this—for example if they are located relatively high in the reactor.

It can be noted that polymer is continuously or discontinuously removed during steady-state production to maintain an approximately constant level of polymer in the reactor. In contrast, as used herein "removing at least the majority of the first polymer in the reactor" means that compared to the average amount of first polymer in the reactor during steady-state production of the first polymer the amount of polymer remaining in the reactor is reduced by more than 50 wt %. (For avoidance of doubt, the amount of polymer remaining should be determined after the first polymerisation reaction has completely stopped.) Generally, it is preferred that the amount of polymer remaining in the reactor is reduced by at least 80 wt %, more preferably at least 90 wt %, and yet more preferably at least 95 wt % compared to the average amount of polymer in the reactor during steady-state production of the first polymer.

Generally it is most preferred to remove as much as possible of the first polymer i.e. to empty the reactor of the first polymer as completely as possible. However, relatively small amounts of polymer can remain in the reactor and be hard to remove. Most preferably, therefore, it is preferred to remove substantially all of the polymer in the reactor, by which is meant that compared to the average amount of polymer in the reactor during steady-state production of the first polymer the amount of polymer remaining in the reactor is reduced by at least 98 wt %.

The removed first polymer is passed to a degassing vessel. Degassing vessels are used in conventional polymerisation processes to remove unreacted reactants and inerts from the polymer product prior to further processing. Thus, no additional equipment is required for this step which is part of the normal product treatment. The degassing vessel is preferably a degassing column in which polymer is countercurrently contacted with a purge gas. More than one degassing vessel may be present in series, or a single vessel may include more than one stage in which degassing occurs.

In both the first and second aspects of the present invention the polymer should be retained in the degassing vessel until at least the majority of any unreacted components have been removed. In addition, in the second aspect of the present invention the polymer should be retained in degassing vessel also until the storage silo is empty of the seed-bed compatible with the second polymerisation reaction.

In both the first and second aspects of the present invention a seedbed is introduced into the reactor after the removal of the first polymer (albeit that different seedbeds are introduced in the first and second options of the first aspect).

Prior to this step it may be necessary, or at least advantageous, to perform one or more steps to treat the reactor. For example, if not already used, where the first polymerisation catalyst system is incompatible with the subsequent polymerisation catalyst system to be used a deactivating agent (also known as a "poison" or a "kill" agent) may be used to deactivate any remaining traces of the first polymerisation catalyst (including any co-catalysts which might have been used). Examples of deactivating agents for various polymerisation catalyst systems are known, and include, depending on the catalyst system, air, water, carbon monoxide and carbon dioxide.

Purging may also be useful prior to seedbed introduction, in particular to remove any treatment agents which have been added. However, purging may instead (or in addition) be performed after seedbed introduction.

The seed-bed may, when introduced into the reactor, be substantially contaminant free, as described in U.S. Pat. No. 6,838,532.

Alternatively, and preferably, the seedbed comprises at least 50 ppm of contaminants.

By "ppm of contaminants" as used herein is meant parts per million by weight of contaminants as measured in the gas phase. Similarly, reference to "amount of contaminants" means the amount of contaminants by weight as measured in the gas phase. In the process of the present invention the amount of contaminants in the seedbed on introduction to the reactor should be determined based on gas phase measurements in the storage container or vessel in which the seedbed is kept prior to its introduction to the reactor. The measured amount of contaminants may vary over time based on the conditions in the container or vessel where it is kept. Therefore, as used herein, the seedbed should comprise at least 50 ppm of contaminants when measured immediately prior to the introduction of the seedbed into the reactor, and this should be measured at the temperature and pressure in the storage container/vessel at this time.

Preferably the seedbed comprises greater than 55 ppm of contaminants, for example at least 65 ppm, and preferably at least 75 ppm, such as at least 100 ppm of contaminants. However, whilst it is possible to have even higher levels of contaminants as discussed further below, preferably the seedbed comprises less than 250 ppm of contaminants, and most preferably less than 100 ppm of contaminants.

As used herein, "contaminants" means components which act to inhibit the activity of polymerisation catalyst system or polymerisation catalyst system residues present in the seedbed. The contaminants may vary depending on the nature of the catalyst system, but generally include components which act as "deactivating agents" for the polymerisation catalyst system residues in the seedbed. Preferred examples according to the present invention include water, carbon monoxide and carbon dioxide.

Air/oxygen can also be used as the contaminant, but is not preferred since use of oxygen can lead to tainting issues in the subsequent reaction.

The seedbed compatible with a second polymerisation reaction is generally formed from an earlier polymerisation reaction as noted above. Such seed beds contain catalyst system remnants from the earlier reaction. Although these may have been deactivated by the use of a deactivating agent, catalyst system residues still remain. It has been found that it is advantageous to store the seed bed in the seedbed storage silo under an amount of contaminants sufficient to prevent any (re-)activity of the catalyst system remnants.

The seedbed in the second aspect of the present invention usually will have been deliberately maintained under an amount of contaminants during storage this ensuring that all catalyst system (including co-catalyst) residues remain inactive in the seedbed. The measured amount of contaminants maintained during this time may vary, either because the measured value will vary depending on the conditions in the container or vessel where it is kept as already noted, or because contaminant is "deliberately" added or removed. Usually the seedbed is maintained during storage with an amount of contaminants which is in excess to any nominal minimum required to deactivate all active sites, but significant excesses provide little further benefit whilst requiring more contaminant to be removed subsequently. In particular, the amount of contaminants is preferably maintained above 50 ppm as measured at any time throughout the storage period (and at the conditions in the storage container or vessel at that time) i.e. it is not simply "topped up" just prior to introduction to the reactor. An upper limit on the amount of contaminants of 500 ppm is generally preferred.

Such a level is significantly below the level which might be expected from leaving a seedbed exposed to air, which would generally be expected to be at least 2000 ppm by weight and usually significantly higher (depending on the humidity in the air among other factors).

It should be noted that the polymerisation catalyst system residues in the seedbed in the second aspect of the present invention will normally be of a different catalyst system to the first polymerisation catalyst system, and therefore it is not always the case that the contaminant in the seedbed will also be a kill agent for the first polymerisation catalyst system, which is why a separate treatment of the reactor prior to seedbed introduction can be required. Nevertheless, where the contaminant in the seedbed is also a kill agent for the first polymerisation catalyst system a separate treatment of the reactor prior to seedbed introduction may not be required even when the catalyst systems are incompatible.

The contaminant amount may also be monitored during storage to ensure it stays above a required amount.

More generally, it is advantageous in the second aspect of the present invention to introduce into the storage silo from the degassing vessel a contaminated seedbed which already comprises at least 50 ppm of contaminants. This can in particular be achieved by adding the contaminant to the polymer prior to or in the degassing vessel, and then using the contaminated polymer to form a contaminated seedbed. Since suitable contaminants for the seedbed include deactivating agents for the catalyst system it is therefore relatively simple to use a deactivated polymer from the degassing vessel with excess deactivating agent providing the required amount of contaminant.

By introducing the seed bed to the reactor in a contaminated form the contaminants can then be removed under the controlled conditions inside the reactor.

Further, it has been found that the treatment to remove the contaminants can often be integrated into the conventional reactor treatments performed prior to initiation of the subsequent (second) polymerisation reaction with little, if any, increase in the total turnaround time.

Thus, this aspect of the present invention not only provides advantages in the storage of the contaminated seedbed, but can avoid the steps previously required to obtain a "contaminant-free" seedbed described in U.S. Pat. No. 6,838,532.

When using a contaminated seedbed, the seedbed is generally then treated in the reactor to reduce the amount of contaminants. Examples of treatment steps include purging with an inert gas and/or scavenging with an agent which will react with the contaminant.

Suitable "scavengers" are organometallic compounds which are reactive towards oxygen and/or water and/or polar compounds as defined in EP 0781300.

Preferably, the scavenger is a hydrocarbon aluminum compound of the formula $AlR_{3-a)}X_a$ where R is alkyl, cycloalkyl, aryl or a hydride radical. Each alkyl radical can be straight or branched chain having from 1 to 20 carbon atoms, preferably 1 to 10 carbon atoms. X is a halogen or hydride, for example chlorine, bromine or iodine, with chlorine being preferred; a is 0, 1 or 2.

The amounts of contaminants which can be tolerated in the production of the second polymer depend somewhat on the contaminant and the sensitivity of the second polymerisation catalyst system to the contaminant.

However, in general terms, the absolute amount of contaminants in the seedbed in the reactor should be reduced to less than 20 ppm, preferably to less than 10 ppm, and most preferably to less than 5 ppm. For avoidance of doubt, in the process of the present invention the amount of contaminants in the seedbed after treatment should be determined based on gas phase measurements in the reactor at the temperature and pressure conditions in the reactor.

It is preferred that, even with a "contaminated" seedbed, the reactor is maintained substantially closed both throughout the transition, by which is meant throughout the steps of the removal of the first polymer bed and the seedbed introduction and through the process generally in order to minimise the introduction of additional contaminants to the reactor. Examples of how to do this are described in U.S. Pat. No. 6,838,532.

As also in U.S. Pat. No. 6,838,532, the term "substantially closed system" as used herein means that the reactor is not exposed to the atmosphere so as to allow contaminants into the reactor during the transition.

For example, rather than opening the reactor to atmosphere to empty it of the first polymer, the reactor may be emptied through the conventional product discharges used during polymerisation, as also described in U.S. Pat. No. 6,838,532. Similarly, the seed-bed comprising at least 50 ppm of contaminants can be introduced without opening the reactor to atmosphere through a suitable inlet line from a suitable storage silo.

It is also possible to "open" the reactor and the system be maintained "substantially closed" as used herein (and as used in U.S. Pat. No. 6,838,532) by having a positive pressure in the reactor to prevent the ingress of air and/or moisture from the atmosphere.

More preferably, however, the reactor is maintained closed throughout the transition.

The seedbed may be introduced to the reactor in varying amounts. For example, the seedbed may be introduced at a lower level than the desired "normal" operating level, and the bed level increased once reaction is commenced. This generally reduces the amount of the seedbed required and minimises the time taken to load the seedbed and to treat it.

However, it is also possible to introduce a "full" seedbed, by which is meant in an amount corresponding to the desired "normal" operating level. Whilst this may add to introduction and treatment times, the corollary is that such bed volumes are generally easier to control and start-up than significantly reduced bed levels.

Subsequent to the seedbed introduction a subsequent polymerisation reaction is conducted.

The second polymerisation reaction requires the introduction of a polymerisation catalyst system for the reaction. In general, the polymerisation catalyst system may be any catalyst system suitable for the polymerisation.

As already noted the polymerisation catalyst system in step (e) may be the same or different to the first polymerisation catalyst system. More generally it can again include any catalyst suitable for the polymerisation, including a Phillips catalyst, a Ziegler catalyst, a metallocene catalyst or a mixed catalyst.

As with the first polymer, the second polymer may be any suitable polymer which can be produced in a gas phase fluidised bed or stirred bed reactor. Generally the first and second polymers are based on the same principal monomer. Thus, where the first polymer is a homopolymer or copolymer of propylene, then the second polymer will also be a homopolymer or copolymer of propylene, whereas where the first polymer is a homopolymer or copolymer of ethylene, then the second polymer will also be a homopolymer or copolymer of ethylene.

As used herein, the first and second catalyst systems are "incompatible" if one or more of the following applies:
1) when tested separately under the conditions in the second polymerisation reaction one of the catalyst systems produces polymers having a weight average molecular weight greater than two times higher than the weight average molecular weight produced by the other catalyst system;
2) when tested separately under the conditions in the second polymerisation reaction the polymers produced by both catalyst systems differ in comonomer incorporation (expressed in mol %) by more than 30%;
3) compared to the productivity (expressed in g polymer/g catalyst) obtained when the second catalyst system is tested alone under the conditions of the second polymerisation reaction, the productivity obtained by replacing 10% by weight of the second catalyst with the same mass of the first catalyst and testing the mixture of the first and second catalyst systems under the same conditions is changed by 50% or more.

For avoidance of doubt, the productivity in the third test above is based on the mass of catalyst (not catalyst system), and the 10% of the second catalyst replaced is replaced with an equivalent mass of the first catalyst. Thus, in fact, the total mass of catalyst ("g catalyst") is the same when the mixed catalyst system is tested as when the second catalyst system is tested. The total mass of the first and second catalyst systems may however vary depending on the other components which may be part of the respective catalyst systems.

Molecular weight and comonomer content should be determined by the methods described in WO 2011/089112.

According to the present invention, and in particular the second aspect of the present invention, a polymerisation process may transition backwards and forwards between reactions using two incompatible catalyst systems with only a single seedbed storage silo.

Similarly, a polymerisation process may transition backwards and forwards between reactions using three incompatible catalyst systems whilst requiring only two seedbed storage silos.

The number of seedbed storage silos for a particular plant can therefore be reduced.

Thus, in a third aspect there is provided an apparatus for the production of polymers in a gas phase reactor, said apparatus comprising:
 a) A gas phase reactor,
 b) Two or more catalyst system feeds to pass at least first and second catalyst systems to the reactor,
 c) A degassing vessel fluidly connected to the reactor to receive polymer product therefrom, and
 d) At least one seed-bed storage silo connected to the degassing vessel to receive polymer therefrom and connected to the reactor to pass polymer thereto,
characterised in that there are less seed-bed storage silos than catalyst system feeds.

For example, there may be provided an apparatus for the production of polymers in a gas phase reactor, said apparatus comprising:
 a) A gas phase reactor,
 b) Two catalyst system feeds consisting of a first catalyst system feed to pass a first catalyst system to the reactor and a second catalyst system feed to pass a second catalyst system to the reactor,
 c) A degassing vessel connected to the reactor to receive polymer product therefrom, and
 d) A seed-bed storage silo connected to the degassing vessel to receive polymer therefrom and connected to the reactor to pass polymer thereto,
characterised in that only one seedbed storage silo is present.

The reactor is preferably a gas phase fluidised bed reactor.

The "at least first and second catalyst systems" of component (b) are incompatible. For example, where two catalyst system feeds are provided for first and second catalyst systems, then the first and second catalyst systems are incompatible. Similarly, three catalyst system feeds may be provided for first, second and third catalyst systems where the first, second and third catalyst systems are incompatible.

The term "catalyst system feed" is used herein to refer broadly to any means by which a catalyst system is fed to a reactor. Thus, a requirement for "two catalyst system feeds" means that there are provided means to feed two different catalyst systems to the reactor. The feed means for one catalyst system need not be completely independent of that for another catalyst system. For example different catalyst system feeds may share one or more lines or vessels by which catalyst system components (catalyst, co-catalyst or other additives) are fed to the reactor. As an example, the two or more catalyst system feeds preferably include separate feed vessels connected to the reactor for each of the catalysts to be passed to the reactor. However, it is also possible for two or more catalyst system feeds to use a common feed vessel with means to feed the different catalysts from separate sources to the common feed vessel, and from there to the reactor. In general this is not preferred, but it can be done as long as suitable procedures to avoid cross-contamination are implemented e.g. control systems to prevent mixing and suitable cleaning steps between catalysts.

Catalyst system may be fed into the reactor through one or more injection points on the reactor. For example, where a catalyst system comprises a catalyst and a co-catalyst or other additive then the catalyst system feed for this catalyst system may feed the different components to the reactor together or separately.

The apparatus according to the third aspect of the present invention may also be, and preferably is, provided with a further connection between the degassing vessel and the reactor suitable for the return of polymer from the degasser to the reactor without passing through a silo. (For avoidance of doubt this connection is in addition to the connection by which polymer passes from the reactor to the degassing vessel.)

This allows the first option in the first aspect of the present invention to be performed as well as the second option/second aspect i.e. the reactor can be reloaded with at least a portion of the bed of first polymer from the degassing vessel whilst the seedbed in the storage silo(s) is maintained therein for subsequent use.

EXAMPLE 1

This example operates in fluidised bed reactor of 5 m diameter producing LLDPE from ethylene with 1-butene as comonomer. The reactor is initially using a Ziegler based catalyst system whilst a metallocene based polymer powder is stored in a seedbed storage silo.

The metallocene powder is stored in the presence of 80 ppm contaminant (water).

During the initial production LLDPE polymer is removed from the reactor and passed to a degassing train comprising a degassing vessel in which the polymer is treated to remove unreacted hydrocarbons before being passed to storage or further treatment e.g. extrusion.

It is desired to transition from operation with the Ziegler based catalyst system to operation with a metallocene based catalyst system.

As a first stage the production is stopped by stopping injection of the Ziegler catalyst system. Reaction continues initially whilst the catalyst system remaining in the reactor is allowed to deactivate partially, before a kill agent is added to stop reaction completely. The reactor is then emptied with the remaining polymer in the reactor being removed to the degassing train. The majority of polymer, after degassing, is sent to storage for further treatment, but a quantity of polymer equivalent to the amount required for a seedbed is kept in the degassing vessel.

For the metallocene operation, the metallocene based polymer powder is transferred from the seedbed storage silo to the empty reactor. The level of contaminant is reduced to less than 5 ppm by use of purging and scavenger addition.

The gas phase for the metallocene operation is then composed before fresh metallocene catalyst system is injected to start the production of metallocene polymer products.

During the reactor preparation (contaminant removal and the gas phase composition) the Ziegler derived polymer powder which had been retained in the degassing vessel is transferred into the now empty seed bed storage silo (where it is retained in the presence of 75 ppm contaminant (water)).

After polymerisation is started with the metallocene catalyst system, withdrawal of polymer from the reactor is resumed, the degassing train becoming refilled with metallocene polymer powder.

EXAMPLE 2

Example 1 is repeated, except that once the Ziegler based operation is terminated and the reactor emptied it is required to restart the reactor for further Ziegler based operation.

In this case, for the subsequent Ziegler operation, the Ziegler based polymer powder is transferred from the degassing vessel directly to the empty reactor, and production is restarted with a seedbed of this polymer powder.

The metallocene polymer powder is retained in the storage silo throughout, and remains available for subsequent metallocene based operation.

The invention claimed is:

1. A process for stopping and restarting polymerisation in a polymerisation system comprising,
   i) a gas phase fluidised bed or stirred bed reactor.
   ii) two or more catalyst system feeds to pass at least first and second catalyst systems to the reactor,
   iii) a degassing vessel fluidly connected to the reactor to receive polymer product therefrom, and
   iv) at least one seed-bed storage silo connected to the degassing vessel to receive polymer therefrom and connected to the reactor to pass polymer thereto,
   wherein there are less seed-bed storage silos than catalyst system feeds,
   said process comprising the steps of:
   a) Conducting a first polymerisation reaction in the reactor using a first polymerisation catalyst system to produce a first polymer,
   b) Stopping the first polymerisation reaction and removing at least the majority of the first polymer in the reactor to the degassing vessel,
   and either:
   c1) Introducing from the seedbed storage silo and into the reactor a seed-bed compatible with a second polymerisation reaction, said seed-bed being of a different material to the first polymer,
   d1) Passing to the seedbed storage silo at least a portion of the first polymer from the degassing vessel to thereby form a new seedbed in the storage silo, and
   e1) Conducting the second polymerisation reaction in the reactor to produce a second polymer;
   or
   d2) Passing to the reactor at least a portion of the first polymer from the degassing vessel to thereby form a new seedbed in the reactor, and
   e2) Conducting a polymerisation reaction in the reactor to produce polymer.

2. A process according to claim 1 wherein in addition to steps d2 and e2 there is provided a step (c2) of maintaining in the seedbed storage silo a seed-bed compatible with a second polymerisation reaction, said seed-bed being of a different material to the first polymer.

3. A process according to claim 1 wherein in step d2 the seedbed is passed directly from the degassing vessel to the reactor without passing through any intermediate storage silos.

4. A process according to claim 1 wherein in step e2 the restarted polymerisation reaction is operated with the same polymerisation catalyst system as the first polymerisation reaction.

5. A process for transitioning in a polymerisation system comprising a gas phase fluidised bed or stirred bed reactor, a degassing vessel and a seedbed storage silo, said process comprising the steps of:
   a) Conducting a first polymerisation reaction in the reactor using a first polymerisation catalyst system to produce a first polymer,
   b) Stopping the first polymerisation reaction and removing at least the majority of the first polymer in the reactor to the degassing vessel,
   c) Introducing from the seedbed storage silo and into the reactor a seed-bed compatible with a second polymerisation reaction, said seed-bed being of a different material to the first polymer,
   d) Passing to the seedbed storage silo at least a portion of the first polymer from the degassing vessel to thereby form a new seedbed in the storage silo, and
   e) Introducing a polymerisation catalyst system and conducting the second polymerisation reaction in the reactor to produce a second polymer.

6. A process according to claim 1 wherein the first polymer is a propylene- or an ethylene-based polymer.

7. A process according to claim 1 wherein step (b) comprises as a first step in stopping the first polymerisation reaction to stop the feed of the first catalyst system.

8. A process according to claim 1 wherein compared to the average amount of polymer in the reactor during steady-state production of the first polymer the amount of polymer remaining in the reactor is reduced by at least 98 wt % in step (b).

9. A process according to claim 1 wherein prior to introduction of the new seedbed there are performed one or more steps to treat the reactor.

10. A process according to claim 1 wherein the seedbed is treated in the reactor to reduce the amount of contaminants, said treatment steps including purging with an inert gas and/or scavenging with an agent which will react with the contaminant.

11. A process according to claim 10 wherein the absolute amount of contaminants in the seedbed in the reactor is reduced to less than 20 ppm, preferably to less than 10 ppm, and most preferably to less than 5 ppm.

12. A process according to claim 5 wherein the first polymer is a propylene- or an ethylene-based polymer.

13. A process according to claim 5 wherein step (b) comprises as a first step in stopping the first polymerisation reaction to stop the feed of the first catalyst system.

14. A process according to claim 5 wherein compared to the average amount of polymer in the reactor during steady-state production of the first polymer the amount of polymer remaining in the reactor is reduced by at least 98 wt % in step (b).

15. A process according to claim 5 wherein prior to introduction of the new seedbed there are performed one or more steps to treat the reactor.

16. A process according to claim 5 wherein the seedbed is treated in the reactor to reduce the amount of contaminants, said treatment steps including purging with an inert gas and/or scavenging with an agent which will react with the contaminant.

17. A process according to claim 16 wherein the absolute amount of contaminants in the seedbed in the reactor is reduced to less than 20 ppm, preferably to less than 10 ppm, and most preferably to less than 5 ppm.

18. An apparatus for the production of polymers in a gas phase reactor, said apparatus comprising:
  a) A gas phase reactor,
  b) Two or more catalyst system feeds to pass at least first and second catalyst systems to the reactor,
  c) A degassing vessel fluidly connected to the reactor to receive polymer product therefrom, and
  d) At least one seed-bed storage silo connected to the degassing vessel to receive polymer therefrom and connected to the reactor to pass polymer thereto,
  wherein there are less seed-bed storage silos than catalyst system feeds.

19. An apparatus according to claim 18, said apparatus comprising:
  a) A gas phase reactor,
  b) Two catalyst system feeds consisting of a first catalyst system feed to pass a first catalyst system to the reactor and a second catalyst system feed to pass a second catalyst system to the reactor,
  c) A degassing vessel connected to the reactor to receive polymer product therefrom, and
  d) A seed-bed storage silo connected to the degassing vessel to receive polymer therefrom and connected to the reactor to pass polymer thereto,
  wherein only one seedbed storage silo is present.

20. An apparatus according to claim 12 which is provided with a further connection between the degassing vessel and the reactor suitable for the return of polymer from the degasser to the reactor without passing through a silo.

* * * * *